US012793951B2

(12) United States Patent
Furuta et al.

(10) Patent No.: US 12,793,951 B2
(45) Date of Patent: Nov. 10, 2026

(54) ION ANALYZER WITH RADICAL GENERATOR AND RADICAL TRANSPORT

(71) Applicant: SHIMADZU CORPORATION, Kyoto (JP)

(72) Inventors: Masaji Furuta, Kyoto (JP); Hidenori Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 469 days.

(21) Appl. No.: 18/032,381

(22) PCT Filed: Sep. 28, 2021

(86) PCT No.: PCT/JP2021/035582
§ 371 (c)(1),
(2) Date: Apr. 18, 2023

(87) PCT Pub. No.: WO2022/091674
PCT Pub. Date: May 5, 2022

(65) Prior Publication Data
US 2023/0386814 A1 Nov. 30, 2023

(30) Foreign Application Priority Data
Nov. 2, 2020 (JP) ................................ 2020-183497

(51) Int. Cl.
*H01J 49/00* (2006.01)

(52) U.S. Cl.
CPC ................................ *H01J 49/0072* (2013.01)

(58) Field of Classification Search
None
See application file for complete search history.

(56) References Cited

U.S. PATENT DOCUMENTS

2015/0028223 A1 1/2015 Kruit et al.
2015/0332899 A1* 11/2015 Kruit .................. G03F 7/70925 250/396 R (Continued)

FOREIGN PATENT DOCUMENTS

CN 104321701 A 1/2015
WO WO-2018186286 A1 * 10/2018 .......... H01J 49/0045
WO 2020/152806 A1 7/2020

OTHER PUBLICATIONS

D. R. Warren, "Surface effects in combustion reactions. Part 2.—Activity of surfaces towards some possible chain-carriers and combustion intermediates", Transactions of the Faraday Society, 1957, pp. 206-209, vol. 53, published by the Royal Society of Chemistry, (UK).

(Continued)

*Primary Examiner* — James Choi
(74) *Attorney, Agent, or Firm* — Sughrue Mion, PLLC

(57) ABSTRACT

Provided is an ion analysis device (10) that irradiates sample component-derived precursor ions with radicals so as to generate product ions and analyzes the product ions, said device comprising: a reaction chamber (142) into which the precursor ions are introduced; a radical generation unit (151) which generates radicals; and a radical transport pipe (152) which connects the radical generation unit (151) and the reaction chamber (142), wherein at least part of the inner wall surface of the radical transport pipe (152) is made of a material having a lesser amount of or lower strength of radical adherence to the inner wall surface of the radical transport pipe (152) in comparison with alumina or quartz. One end (1523) of the radical transport pipe (152) is disposed inside the reaction chamber (142) and preferably faces toward a prescribed region (1424) where ions are localized in the reaction chamber (142).

7 Claims, 3 Drawing Sheets

(56) References Cited

U.S. PATENT DOCUMENTS

| | | | | |
|---|---|---|---|---|
| 2017/0221690 | A1* | 8/2017 | Brown | H01J 49/0418 |
| 2018/0337027 | A1* | 11/2018 | L'Heureux | B01D 53/32 |
| 2020/0111654 | A1* | 4/2020 | Takahashi | H01J 49/0045 |
| 2022/0115225 | A1 | 4/2022 | Takahashi | |

OTHER PUBLICATIONS

International Search Report for PCT/JP2021/035582 dated Nov. 22, 2021.

Written Opinion for PCT/JP2021/035582 dated Nov. 22, 2021.

Chinese Office Action dated Mar. 4, 2026, issued in Chinese application No. 202180068894.6.

* cited by examiner

ION ANALYZER WITH RADICAL GENERATOR AND RADICAL TRANSPORT

CROSS REFERENCE TO RELATED APPLICATIONS

This application is a National Stage of International Application No. PCT/JP2021/035582 filed Sep. 28, 2021, claiming priority based on Japanese Patent Application No. 2020-183497 filed Nov. 2, 2020.

TECHNICAL FIELD

The present invention relates to an ion analyzer that generates product ions by irradiating precursor ions derived from sample components with radicals, and performs analysis such as mass spectrometry and ion mobility.

BACKGROUND ART

In order to identify a high polymer compound or analyze a structure of a high polymer compound, a type of mass spectrometry is used in which ions derived from the high polymer compound (precursor ions) are dissociated one or more times to generate product ions, and the product ions are separated according to mass-to-charge ratio and detected. As a representative method for dissociating ions, the collision-induced dissociation (CID) method in which molecules of an inert gas such as nitrogen gas are made to collide with ions is known. The CID method, in which ions are dissociated by the collision energy with inert molecules, can cause dissociation of various ions, but has poor selectivity in the position where ions are dissociated. Therefore, the CID method is unsuitable for a case where it is necessary to dissociate at a specific position in ions for structural analysis.

As a method for dissociating ions at a specific position, the electron transfer dissociation (ETD) method in which precursor ions are made to collide with negative ions, and the electron capture dissociation (ECD) method in which precursor ions are irradiated with electrons, have been conventionally used. In these methods, the precursor ions are irradiated with negative ions or electrons, so that an unpaired electron is generated at a specific position in the precursor ions and dissociation occurs at the position. However, in the ETD method and the ECD method, when the precursor ion is a positive ion, the valence of the ion decreases at the time of dissociation, and thus a neutral molecule is generated when a monovalent positive ion is dissociated. Therefore, when many monovalent positive ions are included in the precursor ions, the ETD method and the ECD method are unsuitable.

Patent Literature 1 discloses that ions are dissociated at specific positions by irradiating precursor ions with radicals. In this method, unpaired electrons are generated at specific positions in the precursor ions by irradiation of radicals, so that dissociation occurs at specific positions in the ions. This method is common to the ETD method and the ECD method in terms of generating unpaired electrons, but can also be applied to a case where the precursor ion is a monovalent positive ion because the valence of the ion does not change in dissociation. As the radicals for irradiating the precursor ions, hydrogen radicals, hydroxy radicals, oxygen radicals, nitrogen radicals and the like can be used.

CITATION LIST

Patent Literature

Patent Literature 1: WO 2020/152806 A

Non Patent Literature

Non Patent Literature 1: D. R. Warren, "Surface effects in combustion reactions. Part 2.—Activity of surfaces towards some possible chain-carriers and combustion intermediates" Transactions of the Faraday Society, published by the Royal Society of Chemistry, (UK), 1957, Vol. 53, pp. 206-209

SUMMARY OF INVENTION

Technical Problem

In the device described in Patent Literature 1, radicals generated in a radical generation chamber are introduced into a reaction chamber such as an ion trap or a collision cell through a radical transport pipe made of alumina or quartz. Then, the precursor ions are irradiated with radicals in the reaction chamber, so that the precursor ions are dissociated. At this time, a portion of the radicals adhere to the inner wall surface of the radical transport pipe, and the amount of radicals supplied to the reaction chamber decreases by the amount of radicals adhering to the inner wall surface. As a result, the efficiency of dissociating precursor ions is reduced.

Exemplarily described above is a case where precursor ions are irradiated with radicals to be dissociated, whereby product ions are generated, and the product ions are subjected to mass spectrometry. However, the same problem as described above also occurs in a case where product ions are analyzed by other methods.

A problem to be solved by the present invention is to provide an ion analyzer capable of more efficiently dissociating precursor ions by radicals.

Solution to Problem

A first mode of an ion analyzer according to the present invention made to solve the above problem is an ion analyzer which generates and analyzes product ions by irradiating precursor ions derived from a sample component with radicals, the ion analyzer including:

- a reaction chamber into which the precursor ions are introduced;
- a radical generation unit configured to generate radicals; and
- a radical transport pipe connecting the radical generation unit and the reaction chamber, wherein
- at least a part of an inner wall surface of the radical transport pipe is made of a material having a smaller adhesion amount or a smaller adhesion force of the radicals to the inner wall surface of the radical transport pipe than that of alumina or quartz.

A second mode of an ion analyzer according to the present invention is an ion analyzer which generates and analyzes product ions by irradiating precursor ions derived from a sample component with radicals, the ion analyzer including:

- a reaction chamber into which the precursor ions are introduced;
- a radical generation unit configured to generate radicals; and a radical transport pipe connecting the radical generation unit and the reaction chamber, wherein one end of the radical transport pipe is disposed in the reaction chamber and is directed to a predetermined region where a distribution of ions is thick in the reaction chamber.

A third mode of an ion analyzer according to the present invention is an ion analyzer which generates and analyzes product ions by irradiating precursor ions derived from a sample component with radicals, the ion analyzer including:

a reaction chamber into which the precursor ions are introduced;

a radical generation unit configured to generate radicals; and a radical transport pipe connecting the radical generation unit and the reaction chamber, wherein the ion analyzer further includes:

a joint including a cylindrical portion and a flare portion, one end of the cylindrical portion being connected to an inside of the reaction chamber through an opening provided in the reaction chamber, an inner diameter of the cylindrical portion being smaller than a diameter of the opening, the radical transport pipe being inserted into the cylindrical portion, the flare portion being provided to be connected to the other end of the cylindrical portion and having an inner diameter increasing with distance from the other end; and a holder configured to hold the joint in a movable manner along an outer surface of the reaction chamber.

Advantageous Effects of Invention

<First Mode>

An ion analyzer according to a first mode can suppress adhesion of radicals generated in a radical generation unit to an inner wall surface of a radical transport pipe and increase the amount of radicals supplied to a reaction chamber by using the radical transport pipe in which at least a part of an inner wall surface is made of a material having a small adhesion amount or a small adhesion force of the radicals (that is, radicals generated in the radical generation unit) as compared to alumina, quartz, and the like. Therefore, the efficiency of dissociating precursor ions can be increased by the ion analyzer according to the first mode. Here, the "adhesion amount" and "adhesion force" of radicals to the surface of a certain object (the inner wall surface of the radical transport pipe in the present invention) are determined in relation to the probability (adhesion probability) that radicals in contact with a surface of the object adhere to the object. It can be said that the smaller the adhesion probability, the smaller the adhesion amount to the surface of the object, and the smaller the adhesion force. Borosilicate glass is an example of material that has a small adhesion amount or a small adhesion force of radical to a surface as compared to alumina or quartz. In comparison to alumina, quartz, and the like, borosilicate glass has an advantage in that particularly hydrogen radicals and oxygen radicals are less likely to adhere to.

<Second Mode>

In a reaction chamber such as an ion trap or a collision cell, the electric field formed therein is generally non-uniform. In a collision cell, further, the electric field is set to incline with respect to the traveling direction of ions in order to converge ions rapidly. When such a non-uniform or inclined electric field is formed, the distribution of ions (including precursor ions and ions in the middle of multiple dissociation of precursor ions) is thick in a specific region in the reaction chamber. Since one end of the radical transport pipe is directed to such a region where the distribution of ions is thick, the ion analyzer according to the second mode can efficiently supply radicals to the region, and further increase the efficiency of dissociating ions.

In order to direct one end of the radical transport pipe toward the region where the distribution of ions is thick, the radical transport pipe may be attached obliquely to a wall surface of the reaction chamber, or may be attached perpendicularly to the wall surface and bent in the reaction chamber so that the distal end is directed toward the region. Here, when the radical transport pipe is bent, the radicals easily collide with the inner wall surface of the radical transport pipe at the bent portion, whereby more radicals adhere to the inner wall surface, and the amount of radicals supplied to the reaction chamber may decrease. However, even if such a bent portion is present, the ion analyzer according to the second mode can suppress a decrease in the amount of radicals supplied to the reaction chamber by using a radical transport pipe having a feature in that radicals (in particular, oxygen radicals) are less likely to adhere to, in comparison to alumina, quartz, and the like.

<Third Mode>

In mass spectrometers, generally, the reaction chamber such as the ion trap or the collision cell is disposed in a vacuum vessel, whereas the radical generation unit is disposed outside the vacuum vessel because the radical generation unit is generally large due to, for example, a device for generating an electric field or a magnetic field. Therefore, the radical transport pipe is required to be routed from the outside of the vacuum vessel to the reaction chamber in the vacuum vessel. When such a routing operation (in particular, the attachment operation inside the reaction chamber) is performed, the operator cannot visually recognize the position of an opening provided in the reaction chamber through which the radical transport pipe should be passed. Thus, sometimes it may happen that the radical transport pipe is pushed in while the positions are not aligned, and as a result, the radical transport pipe may be broken. For example, when a radical transport pipe made of glass or the like having lower mechanical strength than that of the conventional radical transport pipe made of alumina, quartz, and the like is used as the radical transport pipe used in the present invention, breakage is likely to occur.

Therefore, in the ion analyzer according to the third mode, the radical transport pipe is inserted into the opening of the reaction chamber by a joint held in a movable manner along the outer surface of the reaction chamber by a holder. When the radical transport pipe is attached to the reaction chamber, the radical transport pipe is inserted into the reaction chamber from a flare portion of the joint through a cylindrical portion and the opening of the reaction chamber. At this time, even if the position of the radical transport pipe is slightly shifted from the position of the cylindrical portion, the distal end of the radical transport pipe pushes the inner wall surface of the flare portion, so that the joint moves along the outer surface of the reaction chamber, and the radical transport pipe can be inserted into the cylindrical portion. Since the diameter of the opening is larger than the inner diameter of the cylindrical portion (the inner diameter of the cylindrical portion is smaller than the diameter of the opening), even if the joint slightly moves along the outer surface, the radical transport pipe that has passed through the cylindrical portion also passes through the opening. As a result, the radical transport pipe can be easily attached to the reaction chamber without being broken.

DESCRIPTION OF EMBODIMENTS

Embodiments of an ion analyzer according to the present invention will be described with reference to FIGS. 1 to 6.

Figure 1:
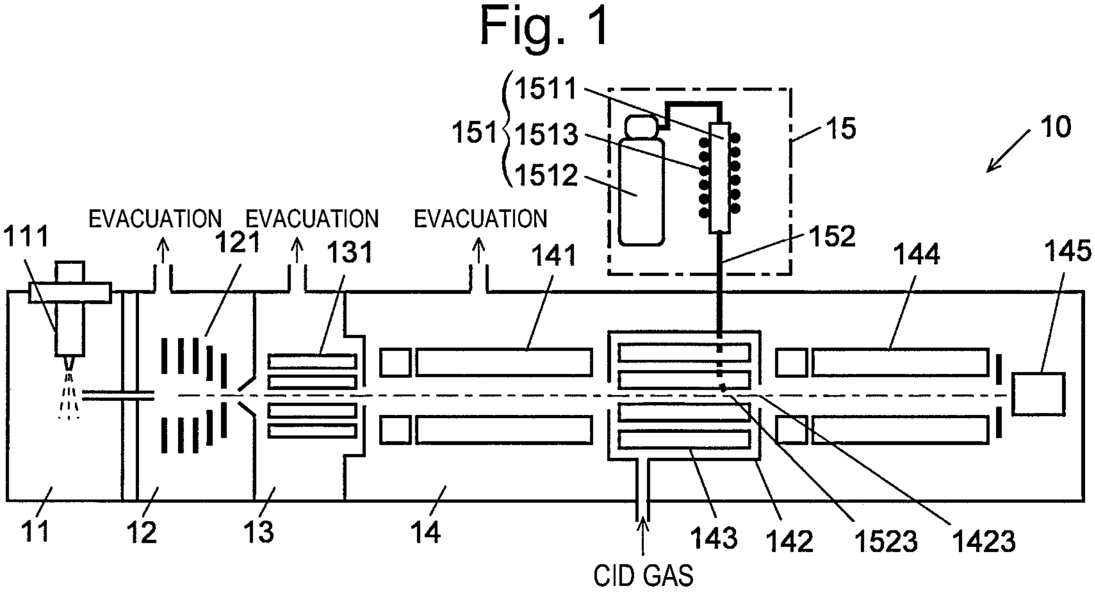
FIG. 1 is a schematic diagram illustrating an overall configuration of a mass spectrometer which is an embodiment of an ion analyzer according to the present invention.
Figure 2:
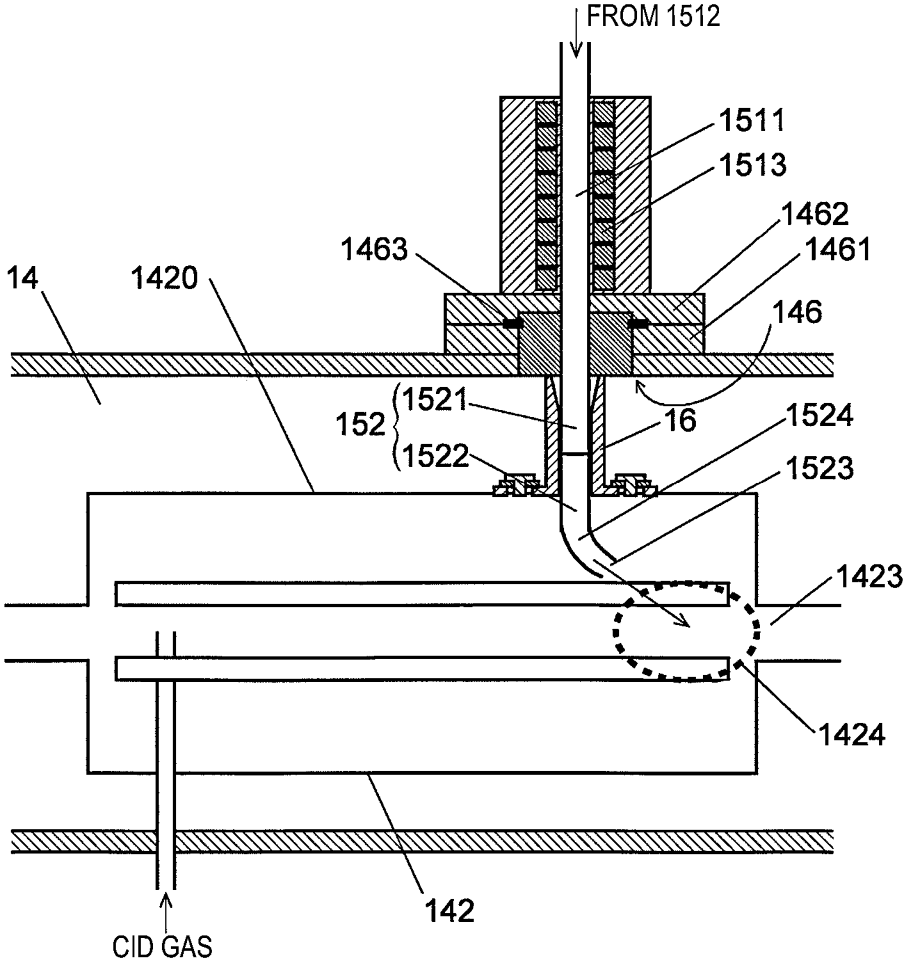
FIG. 2 is a diagram enlarging a part of the mass spectrometer of the present embodiment.

(1) Configuration of Ion Analyzer (Mass Spectrometer) According to Present Embodiment FIG. 1 schematically illustrates an overall configuration of a mass spectrometer 10 which is an ion analyzer of the present embodiment, and FIG. 2 in which a part of the mass spectrometer 10 is enlarged illustrates a detailed configuration of the part. The mass spectrometer 10 has a configuration of a multi-stage differential exhaust system including a first intermediate vacuum chamber 12 and a second intermediate vacuum chamber 13 in which the degree of vacuum is increased stepwise between an ionization chamber 11 at substantially atmospheric pressure and an analysis chamber 14 that is evacuated to a high vacuum by a vacuum pump (not illustrated). In the ionization chamber 11, for example, an electrospray ionization (ESI) probe 111 is installed. In order to transport the ions to the subsequent stage while converging the ions, an ion guide 121 is installed in the first intermediate vacuum chamber 12, and an ion guide 131 is installed in the second intermediate vacuum chamber 13. In the analysis chamber 14, a front quadrupole mass filter 141 that separates ions according to a mass-to-charge ratio, a collision cell (corresponding to the reaction chamber) 142 in which a multipole ion guide 143 is installed, a rear quadrupole mass filter 144 that separates ions according to a mass-to-charge ratio, and an ion detector 145 are installed.

The mass spectrometer 10 further includes a radical generation/irradiation unit 15. The radical generation/irradiation unit 15 includes a radical generation device 151 and a radical transport pipe 152.

The radical generation device 151 includes a radical generation chamber 1511, a gas supply source 1512 that supplies a gas as a raw material of radicals into the radical generation chamber 1511, and a radio-frequency electromagnetic field source 1513. As the raw material gas, oxygen, air, water vapor, and the like is used. The radio-frequency electromagnetic field source 1513 includes a coil and a radio-frequency power supply (not illustrated), and forms a radio-frequency electromagnetic field in the radical generation chamber 1511 by causing a radio-frequency electric current to flow from the radio-frequency power supply to the coil. A raw material gas of radicals is introduced into the radical generation chamber 1511 from the gas supply source 1512, and then the radio-frequency electromagnetic field is formed in the radical generation chamber 1511 by the radio-frequency electromagnetic field source 1513, so that radicals are generated in the radical generation chamber 1511. For example, oxygen radicals are generated when the raw material gas is oxygen, oxygen radicals and nitrogen radicals are generated when the raw material gas is air, and hydrogen radicals, oxygen radicals and hydroxy radicals are generated when the raw material gas is water vapor.

The radical transport pipe 152 is a pipe that connects the radical generation chamber 1511 and a collision cell 142, and introduces radicals generated in the radical generation chamber 1511 into the collision cell 142. In the present embodiment, a pipe made of borosilicate glass is used as the radical transport pipe 152. PYREX (registered trademark) manufactured by Corning Inc. is known as a typical example of borosilicate glass. The radical transport pipe 152 made of borosilicate glass has a feature by which it less likely to adhere to radicals (in particular, oxygen radicals), that is, the adhesion amount is small and the adhesion force is small as compared to a case where alumina, quartz, or the like is used.

The radical transport pipe 152 is inserted into the collision cell 142 through an analysis chamber opening 146 provided in the analysis chamber (corresponding to the vacuum vessel) 14 and a collision cell opening (corresponding to the "opening provided in the reaction chamber") 1421 provided in the collision cell 142.

In the present embodiment, the radical generation chamber 1511 is constituted by the pipe made of borosilicate glass which is integrated with the radical transport pipe 152. Therefore, similarly to the radical transport pipe 152, radicals hardly adhere to the radical generation chamber 1511. However, this point is not essential in the present invention, and a radical generation chamber 1511 separate from the radical transport pipe 152 may be used. Even when the radical generation chamber 1511 that is separated is used, it is preferable that the radical generation chamber 1511 be made of borosilicate glass, but this point is also not essential in the present invention.

Figure 3:
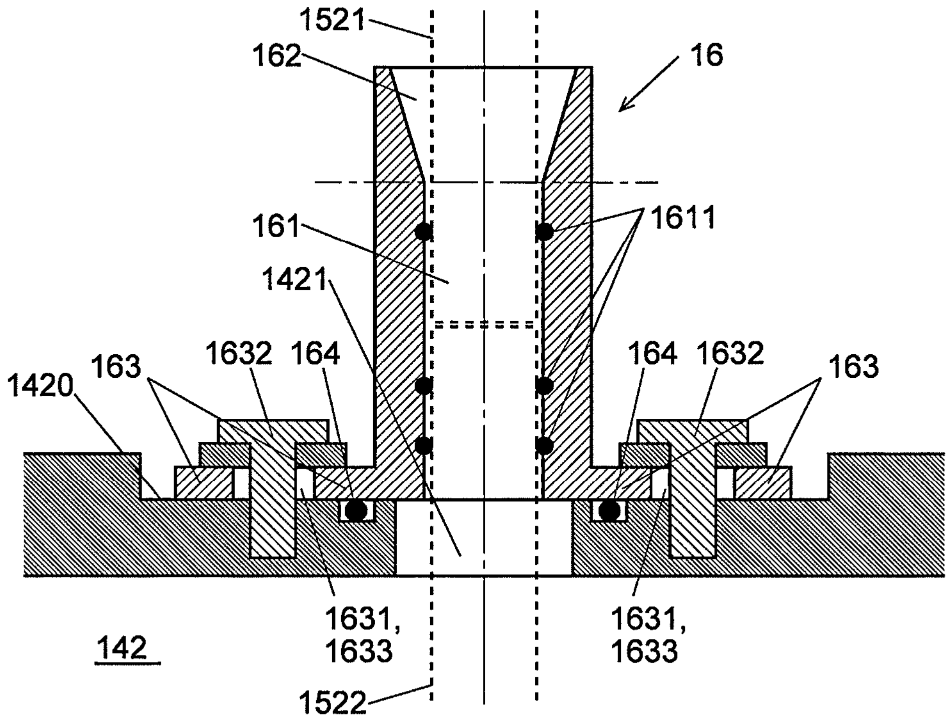
FIG. 3 is a diagram further enlarging a part of the mass spectrometer of the present embodiment that is also a portion including a joint.

A joint 16 is provided outside the collision cell 142. FIG. 3 is an enlarged diagram of the vicinity of the joint 16. The joint 16 is provided with a cylindrical portion 161, a portion 162, and a sealing plate 163. One end of the cylindrical portion 161 is connected to the inside of the collision cell 142 through the collision cell opening 1421, and an inner diameter of the cylindrical portion 161 is smaller than that of the collision cell opening 1421. The flare portion 162 is provided to be connected to the other end of the cylindrical portion 161, and has a trumpet shape having the inner diameter increasing (toward the upper side in FIG. 3) with distance from the other end of the cylindrical portion 161 (or from the collision cell 142). The radical transport pipe 152 is inserted into the cylindrical portion 161 and the flare portion 162. The sealing plate 163 is a plate-like member provided so as to expand radially outward from one end of the cylindrical portion 161, and is in contact with an outer surface 1420 of the collision cell 142 around the collision cell opening 1421. A vacuum seal 164 including an O-ring is provided between the sealing plate 163 and the outer surface 1420 of the collision cell 142.

The joint 16 is attached to the outer surface 1420 of the collision cell 142 by bolts (corresponding to the holders) 1632 that pass through the two through holes 1631 provided in the sealing plate 163 and are fastened to the outer surface 1420 of the collision cell 142. The diameter of each through hole 1631 is smaller than the diameter of the head portion of the bolt 1632 and larger than the diameter of the shaft portion of the bolt 1632. Therefore, a gap 1633 is formed between the edge of the through hole 1631 and the shaft portion of the bolt 1632. In the present embodiment, it is designed such that the gap 1633 of about 1 mm is formed around the shaft portion when the center of the through hole 1631 coincides with the central axis of the bolt 1632 (at this time, the central axis of the cylindrical portion 161 and the center of the collision cell opening 1421 also coincide with each other), but a design value of the size of the gap 1633 may be appropriately changed. The joint 16 can move along the outer surface 1420 of the collision cell 142 by the amount of the gap 1633.

A flange 1461 is provided around the analysis chamber opening 146. A lid 1462 is attached to the flange 1461, the radical transport pipe 152 passing through the center of the lid 1462. A vacuum seal 1463 including a ring-shaped copper plate is provided between the flange 1461 and the lid 1462. As a result, the analysis chamber opening 146 is airtightly closed.

The radical transport pipe 152 is divided into a first portion 1521 on the radical generation chamber 1511 side and a second portion 1522 on the collision cell 142 side in the cylindrical portion 161. Vacuum seals 1611 each including an O-ring are provided between the first portion 1521 and the inner wall surface of the cylindrical portion 161, and between the second portion 1522 and the inner wall surface of the cylindrical portion 161. A seam between the first portion 1521 and the second portion 1522 is not bonded, and the vacuum seal is not provided on the seam. However, since the vacuum seals 1611 are provided between the first portion 1521 and the inner wall surface of the cylindrical portion 161 and between the second portion 1522 and the inner wall surface of the cylindrical portion 161, radicals do not leak outside the joint 16 from this seam.

While the first portion 1521 of the radical transport pipe 152 is entirely linear, the second portion 1522 disposed in the collision cell 142 is linear in the joint 16, but a bent portion 1524 is provided in the radical transport pipe 152 (the radical transport pipe 152 is bent) outside the joint 16 (on the side of the collision cell 142) so that a distal end (one end) 1523 is directed to a region (the "predetermined region") 1424 near an ion outlet 1423 of the collision cell 142. The region 1424 near the ion outlet 1423 located ahead of the distal end 1523 of the radical transport pipe 152 is likely to retain ions, and is a region where the concentration of ions is high in entire of the collision cell 142.

(2) Procedure for Assembling Mass Spectrometer of Present Embodiment

Next, in the procedures for assembling the mass spectrometer 10 of the present embodiment, in particular, a procedure for attaching the radical transport pipe 152 to the collision cell 142 will be described.

First, in the radical transport pipe 152, a pipe including the first portion 1521 and the radical generation chamber 1511 integrated with the first portion 1521 is inserted into the coil of the radio-frequency electromagnetic field source 1513. At the same time, the linear portion of the second portion 1522 is inserted into the cylindrical portion 161 of the joint 16. The joint 16 and the second portion 1522 inserted into the joint 16 are attached to the outer surface 1420 with the bolts 1632 before the collision cell 142 is installed in the analysis chamber 14. At this time, as described above, the gap 1633 of about 1 mm is formed around the shaft portion of each bolt 1632.

Figure 4:
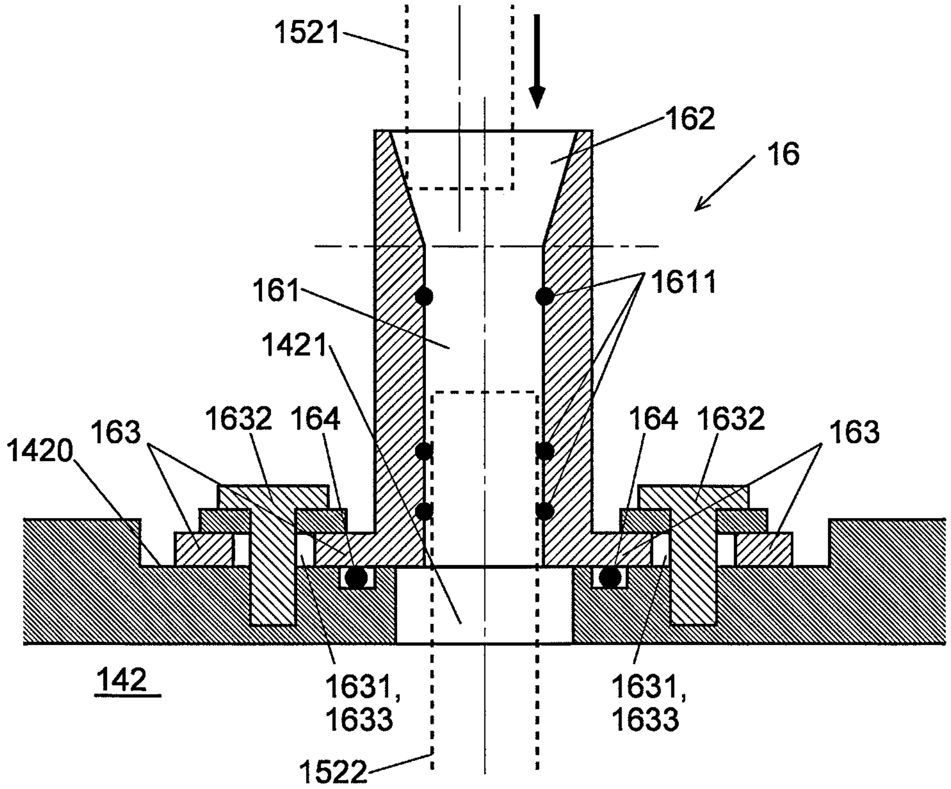
FIG. 4 is a diagram illustrating a state in which a first portion of a radical transport pipe is about to be inserted into a collision cell in a state in which the central axis of the first portion of the radical transport pipe is shifted from the center of a collision cell opening when the radical transport pipe is attached to the collision cell.
Figure 5:
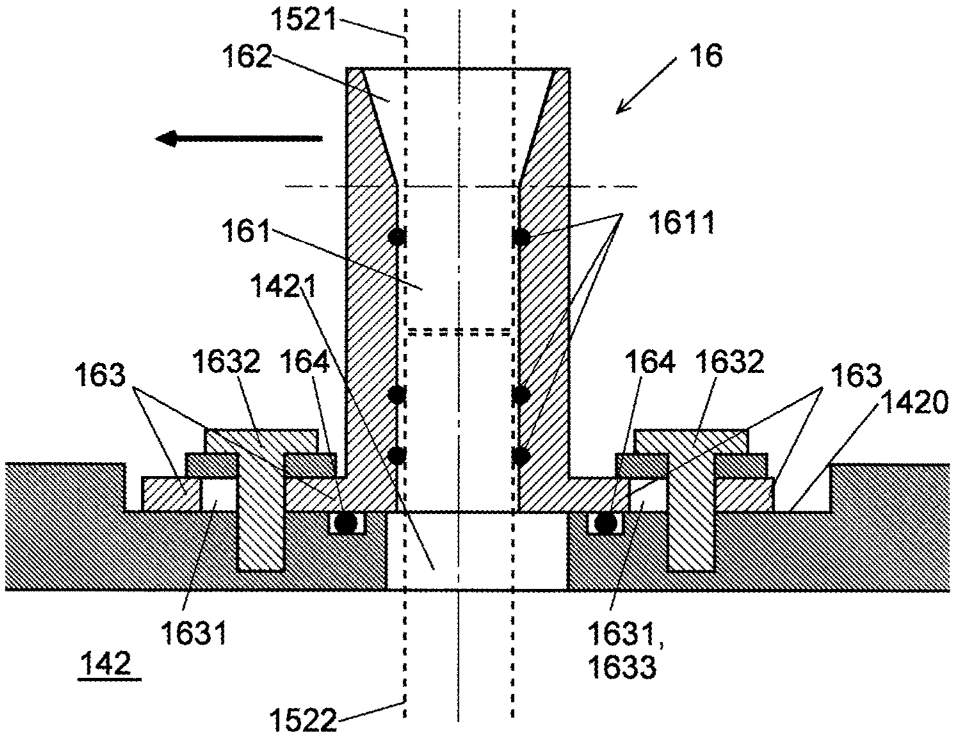
FIG. 5 is a diagram illustrating a state in which the joint moves in the left direction of the drawing when the radical transport pipe is attached to the collision cell.

After the collision cell 142 is installed in the analysis chamber 14, the first portion 1521 of the radical transport pipe 152 fixed to the radio-frequency electromagnetic field source 1513 is inserted into the analysis chamber 14 from the outside of the analysis chamber 14 through the analysis chamber opening 146, and further inserted into the cylindrical portion 161 of the joint 16. At this time, since the operator cannot visually recognize the position of the joint 16 in the analysis chamber 14, the distal end of the radical transport pipe 152 may be pressed against the joint 16 while the central axis of the radical transport pipe 152 and the central axis of the cylindrical portion 161 are misaligned (FIG. 4). In such a case, the inner wall surface of the flare portion 162 formed to be enlarged in diameter from the cylindrical portion 161 side is pushed by the distal end of the radical transport pipe 152, whereby the joint 16 moves along the outer surface 1420 of the collision cell 142 (moves in the left direction in the example illustrated in FIG. 5). As a result, the positions of the central axis of the radical transport pipe 152 and the central axis of the cylindrical portion 161 coincide with each other, and the first portion 1521 of the radical transport pipe 152 can be inserted into the cylindrical portion 161. At this time, since the collision cell opening 1421 is larger than the inner diameter of the cylindrical portion 161 (and the outer diameter of the second portion 1522), the second portion 1522 attached to the cylindrical portion 161 in advance can also be moved together with the joint 16. Thus, the operation for installing the radical transport pipe 152 including the first portion 1521 and the second portion 1522 is completed.

In a case where borosilicate glass having relatively low mechanical strength is used as the material of the radical transport pipe 152 as in the present embodiment, when the collision cell 142 is forcibly attached while the radical transport pipe 152 is not disposed at the correct position, breakage may occur. However, according to the present embodiment, even if the central axis of the radical transport pipe 152 and the central axis of the cylindrical portion 161 are misaligned at an initial point in time, the radical transport pipe 152 can be inserted into the cylindrical portion 161, so that it is possible to prevent the radical transport pipe 152 from being broken by being forcibly pushed.

In the present embodiment, the radical transport pipe 152 is divided into the linear first portion 1521 and the second portion 1522 provided (bent) with the bent portion 1524. Therefore, by attaching the second portion 1522 to the joint 16 in advance before installing the collision cell 142 in the analysis chamber 14, only the linear first portion 1521 is inserted into the joint 16 in the analysis chamber 14 from the outside of the analysis chamber 14 through the analysis chamber opening 146, which facilitates the operation.

In the mass spectrometer 10 of the present embodiment, depending on an insertion position of the first portion 1521 during assembly, the position of the distal end 1523 of the radical transport pipe 152 to be finally fixed may differ within a range (about ±1 mm) corresponding to the gap 1633 around the shaft portion of each bolt 1632 with respect to the direction in which the ions in the collision cell 142 move. However, since the direction in which the ions in the collision cell 142 move is sufficiently larger than the difference in position, this difference in position does not become a problem in practical use.

(3) Operation of Mass Spectrometer of Present Embodiment

Mass spectrometry operation in the mass spectrometer 10 of the present embodiment will be described. Before the start of the analysis, the space from the ionization chamber 11 to the analysis chamber 14 is evacuated to a predetermined degree of vacuum by a vacuum pump. When the analysis is started, for example, a liquid sample that has passed through a column (not illustrated) of a liquid chromatograph is supplied to the ESI probe 111. In the ESI probe 111, the liquid sample passes through a capillary, a high voltage being applied between the capillary and the ground, and is then nebulized into the ionization chamber 11. As a result, the solvent of the liquid sample is released in the ionization chamber 11, and ions derived from the sample are generated. The generated various ions are introduced into the first intermediate vacuum chamber 12 and converged by the ion guide (ion lens) 121, and subsequently introduced into the second intermediate vacuum chamber 13 and further converged by an octapole type ion guide 131. The ions converged by the ion guide 131 are introduced into the front quadrupole mass filter 141 in the analysis chamber 14. In the front quadrupole mass filter 141, only ions having a specific mass-to-charge ratio corresponding to the voltage applied to the front quadrupole mass filter 141 are allowed to pass through. The ions that have passed through the front quadrupole mass filter 141 in this manner are introduced into the collision cell 142 as precursor ions.

In the collision cell 142, inert gas (CID gas) is caused to collide with precursor ions passing through the multipole ion guide 143, so that the precursor ions are dissociated. Furthermore, the radicals generated in the radical generation chamber 1511 are supplied into the collision cell 142 through the radical transport pipe 152. As a result, the precursor ions or ions in which the precursor ions are dissociated come into contact with the radicals, and the ions are dissociated. In this way, various product ions are generated. The generated product ions are separated for each mass-to-charge ratio by the rear quadrupole mass filter 144, and are detected for each mass-to-charge ratio in the ion detector 145.

In the mass spectrometer 10 of the present embodiment, the pipe made of borosilicate glass is used as the radical transport pipe 152 that supplies radicals to the collision cell 142. As described in Non Patent Literature 1, borosilicate glass has a feature that radicals, particularly oxygen radicals, are less likely to adhere, that is, the adhesion amount of radicals is small, and the adhesion force is small. Therefore, adhesion of radicals to the inner wall surface of the radical transport pipe 152 can be suppressed, and the amount of radicals supplied to the collision cell 142 can be increased. As a result, the efficiency of dissociating precursor ions in the collision cell 142 can be increased.

Here, in order to confirm the influence of the adhesion of radicals to the inner wall surface of the radical transport pipe, an experiment was conducted to measure an OAD efficiency using each of the radical transport pipes made of borosilicate glass and alumina. The following describes the results of the experiment. "OAD" is oxygen attachment dissociation, and "OAD efficiency" is a value obtained by dividing the amount of OAD-reacted ions by the amount of precursor ions expressed in percentage. The higher value of the OAD efficiency, the more difficult it is for oxygen radicals to adhere to the inner wall surface of the radical transport pipe. Since it is difficult to bend (or provide the bent portion 1524 to) the radical transport pipe made of alumina, in order to clarify that the difference in the radical adhesion suppression effect is caused by the difference in materials, the radical transport pipe made of borosilicate glass without the bent portion 1524 was used as with the radical transport pipe made of alumina.

Figure 6:
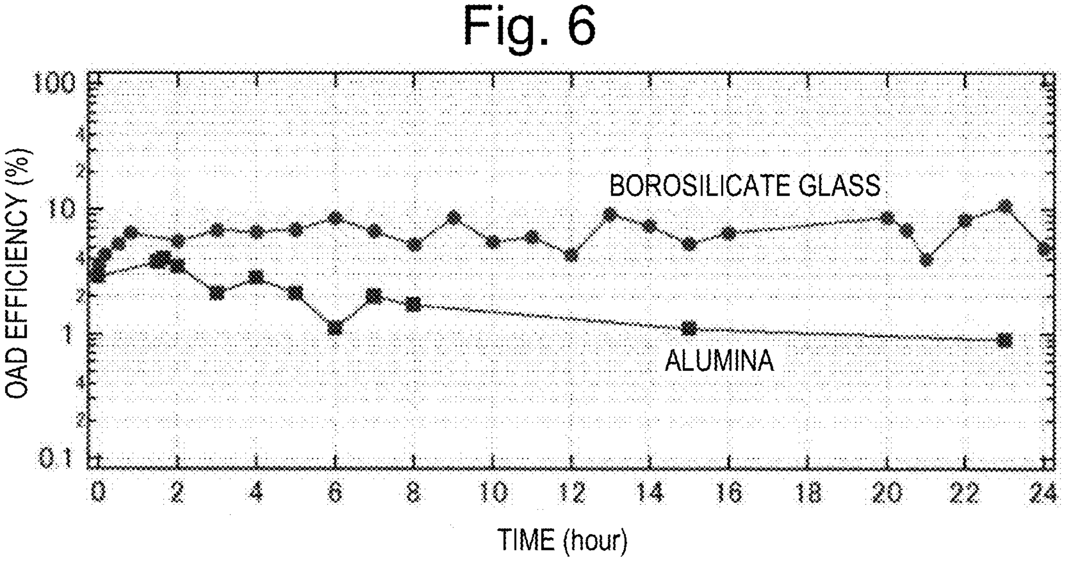
FIG. 6 is a graph illustrating results of measuring Oxygen Attachment Dissociation (OAD) efficiency in respective cases of using a radical transport pipe made of borosilicate glass (corresponding to the present embodiment) and using a radical transport pipe made of alumina (comparative example).

FIG. 6 illustrates the experimental results. It can be seen that the OAD efficiency is higher and oxygen radicals are less likely to adhere to the inner wall surface when the radical transport pipe made of borosilicate glass is used than a case of the radical transport pipe made of alumina is used.

In the mass spectrometer 10 according to the present embodiment, the bent portion 1524 is provided in the radical transport pipe 152 so that the distal end 1523 of the radical transport pipe 152 is directed to the region 1424 near the ion outlet 1423 of the collision cell 142. Since the region 1424 is a region where the concentration of ions is high in entire of the collision cell 142 as described above, the distal end 1523 of the radical transport pipe 152 is directed to the region 1424. Therefore, the radical can be efficiently supplied to this region 1424. As a result, the efficiency of dissociating precursor ions in the collision cell 142 can be further increased.

Since radicals are more likely to come into contact with the inner wall surface in the bent portion 1524 than in a linear portion, radical loss is likely to occur in the bent portion 1524. However, in the present embodiment, since the borosilicate glass to which radicals hardly adhere is used as the material of the radical transport pipe 152, the loss of radicals can be suppressed even if the bent portion 1524 is provided.

(4) Modified Examples

The present invention is not limited to the above embodiment, and various modifications are possible. For example, the radical transport pipe 152 may be entirely made of borosilicate glass, or the inner wall surface may be made of borosilicate glass and the outer wall surface may be made of another material. As an example of the latter, by using a pipe having a double structure in which a pipe wall made of quartz or alumina is provided around the pipe wall made of borosilicate glass, it is possible to make it difficult for radicals to adhere to the inner wall surface and to increase the mechanical strength. It is preferable that the inner wall surface of the radical transport pipe is entirely made of borosilicate glass, but even if only a part of the inner wall surface is made of borosilicate glass, the effect of the present invention is exhibited. Furthermore, a material other than borosilicate glass may be used as long as the material has a small adhesion amount or a small adhesion force of radical to a surface as compared to alumina or quartz.

The above embodiment may have two characteristics that the distal end 1523 of the radical transport pipe 152 is directed to the predetermined region 1424, and that the joint 16 having the cylindrical portion 161 and the flare portion 162 is held in a movable manner along the outer surface 1420 of the collision cell (reaction chamber) 142 by the bolt (holder) 1632, but may have only one of these two characteristics. Each of these two characteristics can be modified in various ways as follows.

In the above embodiment, the distal end 1523 is directed toward the region 1424 by providing the bent portion 1524 in the radical transport pipe 152. Instead, a linear radical transport pipe may be inserted to be inclined with respect to the direction in which ions travel in the collision cell 142, so that the distal end of the radical transport pipe is directed to the predetermined region.

In the above embodiment, by making the diameter of the through hole 1631 provided in the sealing plate 163 of the joint 16 larger than the diameter of the shaft portion of the bolt 1632 holding the joint 16 on the outer surface 1420 of the collision cell 142, the joint 16 is movable along the outer surface 1420 of the collision cell 142 by the amount of the gap between the edge of the through hole 1631 and the shaft portion of the bolt 1632. Instead, the joint may be held by a guide rail so that the joint moves along the guide rail provided on the outer surface 1420 of the collision cell 142.

In the above embodiment, radicals are supplied to the collision cell 142. Instead of using this collision cell 142 as the reaction chamber, an ion trap may be used. The ion trap includes, for example, a ring electrode having an annular shape and a pair of end cap electrodes (an inlet-side end cap electrode and an outlet-side end cap electrode) disposed to oppose each other with the ring electrode between them. In this ion trap, by applying a predetermined voltage to the ring electrode or the like, precursor ions having a specific mass-to-charge ratio among ions introduced into the ring of the ring electrode are selectively trapped. When the trapped precursor ions are irradiated with radicals, the precursor ions are dissociated into product ions. The product ions thus generated are released from the ion trap by application of a voltage between the inlet-side end cap electrode and the outlet-side end cap electrode, and introduced into a mass separator (for example, a time-of-flight mass separator). In such an ion trap, as in a case of the collision cell 142 of the above embodiment, a pipe made of borosilicate glass can be used as a radical transport pipe for supplying radicals into the ring. The distal end of the radical transport pipe can be directed toward a predetermined region in the ring by providing the bent portion in the radical transport pipe. Furthermore, in order to attach the radical transport pipe to the reaction chamber accommodating the ion trap, the same joint that in the above embodiment can also be used.

In the above embodiment, the mass spectrometer is described as the example, but the same configuration can be adopted in other ion analyzers such as an ion mobility analyzer.

The configuration of each of the above embodiments or modified examples can also be adopted using a radical transport pipe made of a material other than borosilicate glass. For example, in the configuration in which the distal end 1523 of the radical transport pipe 152 is directed to the predetermined region 1424, in a case where the radical transport pipe has the bent portion, a loss due to adhesion of radicals to the inner wall increases in the radical transport pipe made of a material other than borosilicate glass. However, the bent portion may be provided to supply a large number of radicals to the predetermined region. When the distal end is directed in the predetermined direction by inserting the linear radical transport pipe so as to be inclined with respect to the direction in which ions travel in the collision cell, it is possible to suppress the loss of radicals on the inner wall surface of the radical transport pipe regardless of the material of the radical transport pipe. The configuration in which the joint is held in a movable manner along the outer surface of the collision cell (reaction chamber) has an effect of preventing breakage even when a radical transport pipe made of a material other than borosilicate glass is used.

[Modes]

It is obvious for those skilled in the art that the exemplary embodiments described above are specific examples of the following modes.

[Clause 1]

An ion analyzer according to Clause 1 is an ion analyzer which generates and analyzes product ions by irradiating precursor ions derived from a sample component with radicals, the ion analyzer including:

a reaction chamber into which the precursor ions are introduced;

a radical generation unit configured to generate radicals; and a radical transport pipe connecting the radical generation unit and the reaction chamber, wherein at least a part of an inner wall surface of the radical transport pipe is made of a material having a smaller adhesion amount or a smaller adhesion force of the radicals to the inner wall surface of the radical transport pipe than that of alumina or quartz.

With the ion analyzer according to Clause 1, the ion analyzer can suppress adhesion of radicals generated in a radical generation unit to an inner wall surface of a radical transport pipe and increase the amount of radicals supplied to a reaction chamber by using the radical transport pipe in which at least a part of the inner wall surface is made of a material having a small adhesion amount or a small adhesion force of the radicals (that is, radicals generated in the radical generation unit) as compared to alumina, quartz, and the like. As a result, the efficiency of dissociating precursor ions can be increased.

[Clause 2]

An ion analyzer according to Clause 2 is the ion analyzer according to Clause 1, wherein the material is borosilicate glass.

[Clause 3]

An ion analyzer according to Clause 3 is the ion analyzer according to Clause 2, wherein the radical generation unit generates oxygen radicals.

Borosilicate glass has a feature that various radicals such as hydrogen radicals and oxygen radicals are difficult to adhere, and among these radicals, oxygen radicals are particularly difficult to adhere. Therefore, when ions are dissociated by oxygen radicals, that is, when the radical generation unit generates oxygen radicals, using a radical transport pipe in which at least a part of the inner wall surface is borosilicate glass exhibits a particularly remarkable effect.

[Clause 4]

An ion analyzer according to Clause 4 is an ion analyzer which generates and analyzes product ions by irradiating precursor ions derived from a sample component with radicals, the ion analyzer including:

a reaction chamber into which the precursor ions are introduced;

a radical generation unit configured to generate radicals; and a radical transport pipe connecting the radical generation unit and the reaction chamber, wherein one end of the radical transport pipe is disposed in the reaction chamber and is directed to a predetermined region where a distribution of ions is thick in the reaction chamber.

With the ion analyzer according to Clause 4, since one end of the radical transport pipe is directed to a region where the distribution of ions, such as precursor ions introduced into the reaction chamber and ions in the middle of multiple dissociation of precursor ions, is thick, the ion analyzer can efficiently supply radicals to the region, and further increase the efficiency of dissociating ions.

[Clause 5]

An ion analyzer according to Clause 5 is the ion analyzer according to Clause 4, wherein the radical transport pipe is bent.

Since the radical transport pipe is bent in this manner, it is easy to direct one end of the radical transport pipe toward the predetermined region.

[Clause 6]

An ion analyzer according to Clause 6 is an ion analyzer which generates and analyzes product ions by irradiating precursor ions derived from a sample component with radicals, the ion analyzer including:

- a reaction chamber into which the precursor ions are introduced;
- a radical generation unit configured to generate radicals; and
- a radical transport pipe connecting the radical generation unit and the reaction chamber, wherein
- the ion analyzer further includes:
- a joint including a cylindrical portion and a flare portion, one end of the cylindrical portion being connected to an inside of the reaction chamber through an opening provided in the reaction chamber, an inner diameter of the cylindrical portion being smaller than a diameter of the opening, the radical transport pipe being inserted into the cylindrical portion, the flare portion being provided to be connected to another end of the cylindrical portion and having an inner diameter increasing with distance from the other end; and
- a holder configured to hold the joint in a movable manner along an outer surface of the reaction chamber.

With the ion analyzer according to Clause 6, when the radical transport pipe is attached to the reaction chamber, even if the position of the radical transport pipe is slightly shifted from the position of the cylindrical portion of the joint, the distal end of the radical transport pipe pushes the inner wall surface of the flare portion, so that the joint moves along the outer surface of the reaction chamber, and the radical transport pipe can be inserted into the cylindrical portion. Since the diameter of the opening is larger than the inner diameter of the cylindrical portion (the inner diameter of the cylindrical portion is smaller than the diameter of the opening), even if the joint slightly moves along the outer surface, the radical transport pipe that has passed through the cylindrical portion also passes through the opening. As a result, the radical transport pipe can be easily attached to the reaction chamber without being broken.

[Clause 7]

An ion analyzer according to Clause 7 is the ion analyzer according to Clause 6, wherein

- the joint further includes a sealing plate which is a plate-like member provided so as to expand outward in a radial direction of the cylindrical portion from the one end of the cylindrical portion and has two through holes, and
- the holder is a bolt inserted into each of the two through holes and fastened to the outer surface, and a diameter of a head portion of the bolt is larger than a diameter of the through hole and a diameter of a shaft portion of the bolt is smaller than the diameter of the through hole.

In the ion analyzer according to Clause 7, since the diameter of the shaft portion of the bolt serving as the holder is smaller than the diameter of the through hole provided in the sealing plate, a gap exists between the edge of the through hole and the shaft portion of the bolt. The joint can move along the outer surface of the reaction chamber by the amount of the gap.

REFERENCE SIGNS LIST

10 . . . Mass Spectrometer
11 . . . Ionization Chamber
111 . . . Electrospray Ionization (ESI) Probe
12 . . . First Intermediate Vacuum Chamber
121, 131 . . . Ion Guide
13 . . . Second Intermediate Vacuum Chamber
14 . . . Analysis Chamber
141 . . . Front Quadrupole Mass Filter
142 . . . Collision Cell
1420 . . . Outer Surface of Collision Cell
1421 . . . Collision Cell Opening
1423 . . . Ion Outlet
1424 . . . Region Near Ion Outlet
143 . . . Multipole Ion Guide
144 . . . Rear Quadrupole Mass Filter
145 . . . Ion Detector
146 . . . Analysis Chamber Opening
1461 . . . Flange of Analysis Chamber Opening
1462 . . . Lid of Analysis Chamber Opening
1463, 1611, 164 . . . Vacuum Seal
15 Radical Generation/Irradiation Unit
151 . . . Radical Generation Device
1511 . . . Radical Generation Chamber
1512 . . . Gas Supply Source
1513 . . . Radio-Frequency Electromagnetic Field Source
152 . . . Radical Transport Pipe
1521 . . . First Portion of Radical Transport Pipe
1522 . . . Second Portion of Radical Transport Pipe
1523 . . . Distal End of Radical Transport Pipe
1524 . . . Bent Portion
16 . . . Joint
161 . . . Cylindrical Portion
162 . . . Flare Portion
163 . . . Sealing Plate
1631 . . . Through Hole
1632 . . . Bolt
1633 . . . Gap

The invention claimed is:

1. An ion analyzer which generates and analyzes product ions by irradiating precursor ions derived from a sample component with radicals, the ion analyzer comprising:

- a vacuum vessel;
- a collision cell into which the precursor ions are introduced;
- a radical generation device configured to generate radicals; and
- a radical transport pipe connecting the radical generation device and the collision cell, wherein
- the collision cell is disposed in the vacuum vessel,
- the radical generation device is disposed outside the vacuum vessel,
- the radical transport pipe extends from the radical generation device into the collision cell, and
- an inner wall surface of the radical transport pipe in the collision cell is made of borosilicate glass.

2. The ion analyzer according to claim 1, wherein the radical generation device generates oxygen radicals.

3. The ion analyzer according to claim 1, wherein the collision cell comprises a linear ion trap, and one end of the radical transport pipe is directed to an exit of the linear ion trap.

4. The ion analyzer according to claim 3, wherein the radical transport pipe is bent.

5. The ion analyzer according to claim 1, further comprising:

a joint including a cylindrical portion and a flare portion, one end of the cylindrical portion being connected to an inside of the reaction chamber through an opening provided in the reaction chamber, an inner diameter of the cylindrical portion being smaller than a diameter of the opening, the radical transport pipe being inserted into the cylindrical portion, the flare portion being provided to be connected to another end of the cylindrical portion and having an inner diameter increasing with distance from the other end; and a holder configured to hold the joint in a movable manner along an outer surface of the reaction chamber.

6. The ion analyzer according to claim 5, wherein the joint further includes a sealing plate which is a plate-like member provided so as to expand outward in a radial direction of the cylindrical portion from the one end of the cylindrical portion and has two through holes, and the holder is a bolt inserted into each of the two through holes and fastened to the outer surface, and a diameter of a head portion of the bolt is larger than a diameter of the through hole and a diameter of a shaft portion of the bolt is smaller than the diameter of the through hole.

7. The ion analyzer according to claim 1, wherein the collision cell comprises a reaction chamber.

* * * * *